United States Patent [19]
Kao

[11] 3,733,564
[45] May 15, 1973

[54] ADJUSTABLE EQUALIZER CONTROL APPARATUS

[75] Inventor: Chih-Yu Kao, Lawrence, Mass.

[73] Assignee: Bell Telephone Laboratories, Incorporated, Murray Hill, N.J.

[22] Filed: Feb. 22, 1972

[21] Appl. No.: 227,739

[52] U.S. Cl. ....................333/18, 325/65
[51] Int. Cl. ....................H04b 3/04
[58] Field of Search ....................333/18, 28 R, 70 T; 325/42, 65

[56] References Cited

UNITED STATES PATENTS 3,573,667 4/1971 Kao et al. ....................333/18
3,633,129 1/1972 Kao et al. ....................333/18

*Primary Examiner*—Paul L. Gensler
*Attorney*—R. J. Guenther et al.

[57] ABSTRACT

Apparatus for controlling an equalizer having a plurality of independently adjustable, serially connected equalizer sections. The apparatus controls the equalizer to minimize a sum of squares of integrated transmission system misalignments, the integrations taking place over as many frequency ranges as there are equalizer sections. The effect of each equalizer section in each frequency range is considered in determining required adjustments for all sections.

17 Claims, 1 Drawing Figure

PATENTED MAY 15 1973 3,733,564
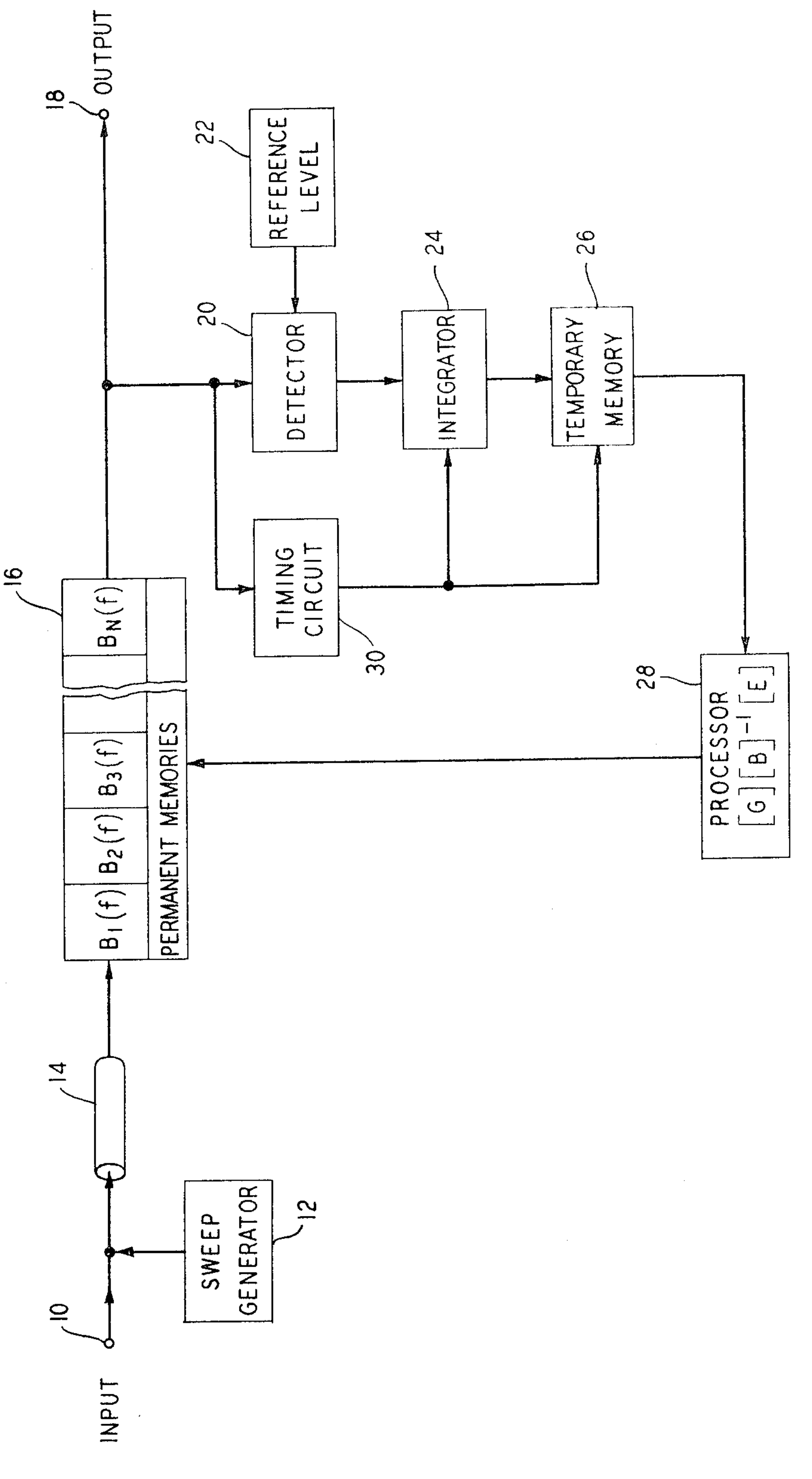

ADJUSTABLE EQUALIZER CONTROL APPARATUS

BACKGROUND OF THE INVENTION

1. Field of the Invention

This invention relates to analog signal transmission systems and more particularly to automatic equalization in wideband, analog communications systems.

2. Description of the Prior Art

In long distance analog signal transmission systems, elaborate precautions must be taken to prevent undue attenuation of the transmitted signal. Where the signal frequencies present in the signal transmitted are distributed over a relatively wide band, the problem is complicated by the fact that attenuation typically varies with frequency.

Among the devices most commonly used to compensate for attenuation in wideband analog transmission systems is the so-called adjustable bump equalizer. Equalizers of this type are discussed, for example, in "The L3 Coaxial System: Equalization and Regulation" by R. W. Ketchledge et al. (*Bell System Technical Journal*, Vol. 32, No. 4, July 1953, pp. 833–878, particularly pp. 842–851) and in "The L4 Coaxial System: Equalizing and Main station Repeaters" by F. C. Kelcourse et al. (*Bell System Technical Journal*, Vol. 48, No. 4, April 1969, pp. 889–952, particularly pp. 896–913). In general, a bump equalizer includes a plurality of independently adjustable, serially connected equalizer sections. Ideally, the frequency response of each of these sections is flat and constant over the operating band of the system with the exception of a predetermined, relatively narrow frequency range (called the effective frequency range) in which the amplitude of that response is adjustable. This adjustment is effected by a single control signal or quantity. By selecting equalizer sections with effective frequency ranges distributed over the entire transmission band of the system, any misalignment in any portion of the transmission band can be corrected by appropriately adjusting the one or more equalizer sections which influence equalization in that portion of the transmission band.

Several types of apparatus for measuring transmission system misalignment and generating signals for controlling the several sections of a bump equalizer are known. The equalizer control apparatus discussed in the above-mentioned article by Kelcourse et al. for example, operates on the assumption that for purposes of adjustment the effective ranges of the equalizer sections are mutually exclusive and that the required adjustment of any section can be determined from the level of a single pilot signal having a frequency within the effective range of that section.

In fact, however, the effective ranges of the sections of realizable bump equalizers are not mutually exclusive. This is in part because the effective ranges of practical equalizer sections are not sharply defined. The effective ranges of the several sections must therefore overlap to some degree in order to span the entire transmission band. In addition, the frequency responses of practical equalizer sections are not perfectly flat or constant outside the effective ranges of the sections. Accordingly, adjustment of each equalizer section influences equalization (at least to some small degree) at all frequencies in the operating band of the system.

One solution to the problem of non-mutual-exclusivity of effective frequency ranges in bump equalizers is proposed by Ketchledge et al. in their above-mentioned article. That solution is to compute the required equalizer control quantities by solving a set of simultaneous equations relating system misalignment at a plurality of pilot signal frequencies to the effectiveness of each equalizer section at those frequencies. The difficulty with this approach is that when pilot signals are used, equalization for the entire frequency band in the vicinity of a pilot signal is based on how the system transmits the single pilot frequency. The broader the operating band of the system, the further apart the pilot signals become. Increasing the number of pilot signals increases the number of simultaneous equations which must be solved, thereby complicating the control apparatus. In addition, there are several broadband attenuation phenomena which are more easily dealt with on a broadband basis than with bump-shaped frequency response functions. Equalizer sections having frequency response functions adjustable over relatively broad frequency ranges are not as amenable to control by pilot signals as sections with relatively narrow effective frequency ranges.

In U. S. Pat. No. 3,573,667 issued jointly to C. F. Kurth and myself on Apr. 6, 1971 and in U. S. Pat. No. 3,633,129 issued jointly to C. F. Kurth, R. C. MacLean, and myself on Jan. 4, 1972, apparatus is disclosed for controlling an equalizer on the basis of transmission system misalignment integrated over frequency ranges corresponding to the effective ranges of the equalizer sections. This avoids the use of pilot signals but does not provide an equalization strategy as comprehensive as that of Ketchledge et al.

It is therefore an object of this invention to improve equalization in analog transmission systems.

It is another object of this invention to provide apparatus for controlling the several sections of an adjustable bump equalizer which does not operate on the assumption of mutual exclusivity between the effective frequency ranges of the several sections.

It is another object of this invention to perform automatic equalization in analog transmission systems without the use of pilot signals.

It is still another object of this invention to provide adjustable equalizer control apparatus suitable for controlling equalizer sections having either broad or narrow effective frequency ranges or both.

SUMMARY OF THE INVENTION

These and other objects of the invention are accomplished, in accordance with the principles of the invention, by adjustable bump equalizer control apparatus which adjusts the frequency response functions of the several sections of the equalizer to minimize a sum of squares of transmission system misalignments integrated over as many frequency ranges in the operating band of the system as there are equalizer sections. A test sweep signal is applied to the transmission system and the level of that signal as transmitted by the system is compared to a predetermined reference signal level to produce an output signal indicative of the misalignment of the system at all frequencies in the operating band of the system. This misalignment signal is integrated over the several frequency ranges mentioned above to produce a plurality of integrated misalignment quantities. These quantities are processed by apparatus which solves a set of simultaneous equations relating transmission system misalignment in each frequency range to the effectiveness of each equalizer section in that frequency range. These equations are derived so that their solution minimizes the sum of the squares of the integrated misalignment quantities. Use of a test sweep signal and integrated misalignment quantities avoids the use of pilot signals and bases equalizer realignment on considerably more information than is available with pilot signals. Computing equalizer control quantities by solving a system of simultaneous equations also improves equalization by utilizing considerably more information about the system, at the same time avoiding the assumption of mutual exclusivity between the effective ranges of the equalizer sections.

Further features and objects of the invention, its nature, and various advantages, will be more apparent upon consideration of the attached drawing and the following detailed description.

BRIEF DESCRIPTION OF THE DRAWING

The single FIGURE of the drawing is a block diagram of the adjustable equalizer control apparatus of this invention.

DETAILED DESCRIPTION OF THE INVENTION

When in service, the transmission system shown in the FIGURE transmits signal information from input terminal 10 to output terminal 18 by way of cable 14 and equalizer 16. Cable 14, of course, represents any long-distance transmission medium and may include any number of intermediate repeaters and equalizers. Equalizer 16 is basically a bump equalizer of any well-known type including N serially connected equalizer sections having normalized frequency response functions $B_1(f)$ through $B_N(f)$, respectively. Each of these functions expresses the effectiveness of the corresponding equalizer section, i.e., the sensitivity of the actual frequency response of the corresponding equalizer section to change in the quantity controlling that section.

Although basically a bump equalizer, equalizer 16 may include one or more equalizer sections having frequency response functions adjustable over relatively broad frequency ranges rather than the relatively narrow effective ranges typical of bump equalizers. Thus one section of equalizer 16 may be designed to have a flat frequency response adjustable across the entire transmission band while another may have an adjustable frequency response which is a function of the square root of frequency for all frequencies in the transmission band. Equalizer sections of this type can be controlled in accordance with the principles of the invention in precisely the same way as equalizer sections having bump-shaped frequency responses.

In any event, the actual amplitude of the frequency response of any section $i$ of equalizer 16 is given by $b_i \cdot B_i(f)$ where $b_i$ is the magnitude of the equalizer control quantity controlling section $i$. The N control quantities $b_1$ through $b_N$ are stored in the permanent memories which are part of equalizer 16.

Periodically, the transmission characteristic of the system described above can be expected to deviate from the desired characteristic. The system will then require equalization, i.e., adjustment of equalizer 16 to restore the system to the proper alignment. This involves computing quantities $\Delta b_1$ through $\Delta b_N$ by which equalizer control quantities $b_1$ through $b_N$, respectively, must be incremented in order to improve the equalization (i.e., reduce the misalignment) of the system. Once determined, incremental control quantities $\Delta b_1$ through $\Delta b_N$ are algebraically combined with the present control quantities $b_1$ through $b_N$, respectively, to produce new values for quantities $b_1$ through $b_N$. Responsive to these new control quantities, the several sections of equalizer 16 readjust to reduce the misalignment of the system.

Let E(f) represent the deviation of the transmission characteristic of the system from the desired level for all frequencies in the transmission band. E(f) therefore represents the misalignment of the system including cable 14 and equalizer 16. This misalignment must be corrected by appropriate adjustment of equalizer 16. Since perfect equalization is a practical impossibility, the residual misalignment, designated S(f), is given as follows:

$$S(f)=E(f)-[\Delta b_1B_1(f)+\Delta b_2B_2(f)+\ldots+\Delta b_NB_N(f)]$$

where $\Delta b_1$ through $\Delta b_N$ are the amounts by which control quantities $b_1$ through $b_N$, respectively, are to be adjusted. The objective of equalization is to select incremental control quantities $\Delta b_1$ through $\Delta b_N$ such that this residual misalignment is minimized.

Since there are N incremental equalizer control quantities to be computed, N frequency ranges $f_1$ through $f_N$ in the operating band of the system are selected. Although not necessarily the case, the following analysis will be most readily understood if these N frequency ranges are thought of as mutually exclusive, ordered frequency ranges which span the operating band of the system. A measure of the residual misalignment in each frequency range is provided by integrating S(f) for all frequencies in that range. Denoting the integral residual misalignment for frequency range $i$, $S_j$ yields $$S_j=\int_{f_j}\{E(f)-[\Delta b_1B_1(f)+\Delta b_2B_2(f)+\ldots+\Delta b_NB_N(f)]\}df \qquad (2)$$

for $1 \leq j \leq N$, where $\int_{f_j}$ indicates integration over frequency range $f_j$. In accordance with the principles of this invention a satisfactory level of residual misalignment S(f) is achieved by adjusting equalizer 16 to minimize the sum of the squares of $S_j$ for all values of $j$. This approach is analogous to the least squares method of curve fitting in calculus.

To simplify the notation in relation (2), let $$\int_{f_j}E(f)df=E_j \qquad (3)$$

and $$\int_{f_j}B_i(f)df=B_{ij}. \qquad (4)$$

It will be evident that $E_j$ as defined by relation (3) is just the transmission system misalignment integrated over frequency range $j$. Similarity $B_{ij}$ is the normalized frequency response function of equalizer section $i$ integrated over frequency range $j$. Relation (2) can then be rewritten $$S_j=E_j-[\Delta b_1B_{1j}+\Delta b_2B_{2j}+\ldots+\Delta b_NB_{Nj}]. \qquad (5)$$

Let Q be the sum of the squares of the $S_j$. Then Q is given by the relation $$Q=\sum_{j=1}^{N} S_j^2 \qquad (6)$$

Substituting relation (5) into relation (6) yields $$Q=\sum_{j=1}^{N} \{E_j-[\Delta b_1 B_{1j}+\Delta b_2 B_{2j}+\ .\ .\ .\ +\Delta b_N B_{Nj}]\}^2 \qquad (7)$$

Q is then minimized in a manner analogous to the method of least squares by satisfying the relationship $$\delta Q/\delta \Delta b_i = 0 \qquad (8)$$

for $1 \leq i \leq N$.

Substituting relation (7) into relation (8) yields N equations of the form $$\frac{\partial Q}{\partial \Delta b_i}=\sum_{j=1}^{N} 2\{E_j-[\Delta b_1 B_{1j}+\Delta b_2 B_{2j}+\ .\ .\ .\ +\Delta b_N B_{Nj}]\}(-B_{ij})=0 \qquad (9)$$

or $$\sum_{j=1}^{N} E_j B_{ij}=\sum_{j=1}^{N} [\Delta b_1 B_{1j}+\Delta b_2 B_{2j}+\ .\ .\ .\ +\Delta b_N B_{Nj}]B_{ij}. \qquad (10)$$

The N simultaneous equations exemplified by (10) can be written in matrix form as follows:

$$\begin{bmatrix} \Sigma B_{1j}^2 & \Sigma B_{2j}B_{1j}\ .\ .\ . & \Sigma B_{Nj}B_{1j} \\ \Sigma B_{1j}B_{2j} & \Sigma B_{2j}^2\ .\ .\ . & \Sigma B_{Nj}B_{2j} \\ \cdot & \cdot & \cdot \\ \cdot & \cdot & \cdot \\ \Sigma B_{1j}B_{Nj} & \Sigma B_{2j}B_{Nj}\ .\ .\ . & \Sigma B_{Nj}^2 \end{bmatrix} \begin{bmatrix} \Delta b_1 \\ \Delta b_2 \\ \cdot \\ \cdot \\ \Delta b_N \end{bmatrix} = \begin{bmatrix} B_{11} & B_{12}\ .\ .\ . & B_{1N} \\ B_{21} & B_{22}\ .\ .\ . & B_{2N} \\ \cdot & \cdot & \cdot \\ \cdot & \cdot & \cdot \\ B_{N1} & B_{N2}\ .\ .\ . & B_{NN} \end{bmatrix} \begin{bmatrix} E_1 \\ E_2 \\ \cdot \\ \cdot \\ E_N \end{bmatrix} \qquad (11)$$

where the indicated summations are for all values of $j$. To simplify the notation still further, let $$\begin{bmatrix} B_{11} & B_{21}\ .\ .\ . & B_{N1} \\ B_{12} & B_{22}\ .\ .\ . & B_{N2} \\ \cdot & \cdot & \cdot \\ \cdot & \cdot & \cdot \\ B_{1N} & B_{2N}\ .\ .\ . & B_{NN} \end{bmatrix} = [B], \qquad (12)$$

$$\begin{bmatrix} \Delta b_1 \\ \Delta b_2 \\ \cdot \\ \cdot \\ \Delta b_N \end{bmatrix} = [\Delta b], \qquad (13)$$

and $$\begin{bmatrix} E_1 \\ E_2 \\ \cdot \\ \cdot \\ E_N \end{bmatrix} = [E]\ . \qquad (14)$$

Relation (11) then becomes $[B]^t[B]\ [\Delta b] = [B]^t[E]$ (15)

where $[B]^t$ indicates the transpose of matrix B. As long as [B] is a nonsingular matrix, relation (15) can be solved for [Δb] as follows: $[\Delta b] = [B]^{-1}[E]$ . (16)

Q is therefore minimized by calculating $\Delta b_1$ through $\Delta b_N$ in accordance with relation (16), i.e., by multiplying a vector E of integral transmission system misalignment quantities by the inverse of a matrix B of integral normalized frequency response quantities. In all cases the integrations are performed with respect to frequency over each of the selected frequency ranges.

Apparatus for determining the integral misalignment quantities which make up vector E and for processing vector E in accordance with relation (16) to produce the incremental equalizer control quantities which make up vector $\Delta b$ is shown in the drawing. When realignment of the transmission system is required, cable 14 and equalizer 16 are taken out of service, for example, by disconnecting the transmission line at terminals 10 and 18. Sweep generator 12, located at the input terminal of cable 14, then generates a test sweep signal which is transmitted by cable 14 and equalizer 16. The required test sweep signal is a signal having a predetermined constant amplitude with frequency varying monotonically from one end of the transmission band to the other. Sweep generator 12 may therefore be any suitable signal generating apparatus.

Detector 20 compares the amplitude of this test sweep signal as transmitted by cable 14 and equalizer 16 to a desired reference level supplied by reference source 22 and produces an output signal proportional to the deviation of the amplitude of the transmitted signal from the reference level for all frequencies in the test sweep signal. It will be evident that the output signal of detector 20 is representative of misalignment function E(f). Detector 20 may therefore be any apparatus capable of determining the amplitude of an applied signal (e.g., an envelope detector) and comparing that amplitude to a reference signal level.

Since the frequency of the test sweep signal generated by sweep generator 12 varies monotonically with time, the frequency for which the output signal of detector 20 represents the misalignment of the system also varies monotonically with time. The required integrations of function E(f) over the N frequency ranges $f_1$ through $f_N$ (see relation (3)) can therefore be performed as N time integrations of the output signal of detector 20 during predetermined portions or segments of the test sweep. Each integration begins when the sweep signal generated by sweep generator 12 reaches the frequency at one end of the corresponding frequency range and continues until the sweep signal reaches the frequency at the other end of that range. Timing circuit 30, responsive to the sweep signal as transmitted by cable 14 and equalizer 16, is therefore arranged to produce output signal indications at the beginning and ending of each of the N frequency ranges to indicate the start and finish of the required integrations of the misalignment signal generated by detector 20. Timing circuit 30 can therefore be any apparatus capable of detecting the occurrence of each of several predetermined signal frequencies. Suitable timing apparatus is shown, for example, in U.S. Pat. No. 3,633,129 cited above.

Integrator 24 performs the N time integrations of the output signal of detector 20 in response to the timing signals produced by timing circuit 30. Assuming the N frequency ranges to be mutually exclusive, only one integration will be in progress at any given time. In that event integrator 24 need only include a single integrating circuit. The result of each integration can then be read out of integrator 24 before the next integration begins.

At the end of each integration as determined by timing circuit 30, temporary memory 26 stores the result of the integration in a separate storage location. Accordingly, when all frequencies in the transmission band have been generated by sweep generator 12 and N integrations have been performed by integrator 24, N signal quantities representative of vector E in relation (16) are stored in memory 26. If the further processing of these quantities (i.e., in processor 28) is to be analog processing, it is appropriate that these signal quantities be stored as analog signal quantities. If, on the other hand, processor 28 is digital processing apparatus, these quantities will more conveniently be stored in memory 26 in digital form. This can be accomplished, for example, by providing an integrator 24 which indicates the result of an integration in digital form.

When all N elements of vector E are stored in memory 26, they are applied to processor 28 for multiplication by the inverse of matrix B in accordance with relation (16). Since the normalized frequency response functions of the several sections of equalizer 16 are known, matrix B can be predetermined and its inverse stored in processor 28. As mentioned above, processor 28 may be either analog or digital apparatus capable of matrix multiplication. Suitable analog circuitry (i.e., a resistive network) is shown in the above-mentioned article by Ketchledge et al. Any of a wide variety of general purpose digital computing machines can be used to perform the required processing digitally. Suitable programming techniques are discussed, for example, in *Introduction to Numerical Methods* and *FORTRAN Programming* by T. R. McCalla (John Wiley & Sons, Inc., 1967).

The N incremental equalizer control quantities $\Delta b_1$ through $\Delta b_N$ generated by processor 28 are applied to equalizer 16 for addition to control quantities $b_1$ through $b_N$ stored in the permanent memories which are part of the equalizer apparatus. The memories of equalizer 16 are therefore conveniently realized as accumulators for adding the incremental control quantities produced by processor 28 to the control quantities already in storage. Responsive to the altered values of control quantities $b_1$ through $b_N$, the N sections of equalizer 16 adjust to improve the alignment of the transmission system. After equalizer 16 has settled into its new alignment, the above-described alignment procedure can be repeated (if necessary) by applying another test sweep signal to the transmission system. The procedure can be repeated as many times as required to achieve the desired level of equalization.

In the event that stability of the equalizer control system is a problem, apparatus may be included in processor 28 for multiplying $[B]^{-1}$ and $[E]$ by a diagonal gain matrix G, i.e., an N by N matrix with gain control quantities on the main diagonal and zeros elsewhere. These gain control quantities are conveniently chosen mathematically less than one to prevent the equalizer control apparatus from attempting a one-step realignment of equalizer 16, thereby insuring the stability of the control system. It will be evident that when gain control of this type is employed, several repetitions of the above-described equalization process will be required to properly align the system.

It is to be understood that the embodiments shown and described herein are illustrative of the principles of this invention only, and that modifications may be implemented by those skilled in the art without departing from the spirit and scope of the invention. For example, any limits for the N required integrations of the misalignment signal can be chosen. Similarly, processor 28 can be designed to perform either analog or digital processing as discussed above.

What is claimed is:

1. In a communications transmission system including a transmission line and an adjustable bump equalizer responsive to signals transmitted by the transmission line, apparatus for controlling the frequency response levels of the several sections of the equalizer comprising:

means for generating signals representative of the misalignment of said transmission system integrated over each of a plurality of frequency ranges in the transmission band of the system;

processor means responsive to said integrated misalignment signals for solving a system of simultaneous equations relating said integrated misalignment signals to the effectiveness of each of said equalizer sections in each of said frequency ranges to produce signals for controlling the frequency response levels of said equalizer sections to reduce the misalignment of said transmission system; and means for applying said control signals to said equalizer sections.

2. The apparatus defined in claim 1 wherein said means for generating comprises:

means for applying a test sweep signal having monotonically varying frequency of a predetermined amplitude to said transmission line;

detector means responsive to the output signal of said equalizer for comparing the amplitude of said test sweep signal as transmitted by said transmission system to a predetermined reference amplitude level to develop a signal representative of the misalignment of said transmission system for all frequencies in said test sweep signal; and means responsive to the frequency of said test sweep signal for integrating said misalignment signal over each of said plurality of frequency ranges to produce said integrated misalignment signals.

3. The apparatus defined in claim 2 wherein said processor means multiplies said integrated misalignment signals by the inverse of a matrix representing the effectiveness of each equalizer section in each of said frequency ranges.

4. In a communications transmission system including a transmission line and an adjustable bump equalizer responsive to signals transmitted by the transmission line, apparatus for controlling the frequency response levels of the several sections of the equalizer comprising:

means for generating signal quantities representative of the misalignment of said transmission system integrated over each of a plurality of frequency ranges in the transmission band of the system;

processor means responsive to said integrated misalignment quantities for generating quantities for controlling said equalizer to reduce the misalignment of said transmission system by solving a set of simultaneous equations relating said integrated misalignment signal quantities to quantities representing the effectiveness of each of said equalizer sections integrated over each of said frequency ranges; and means for applying said equalizer control quantities to said equalizer sections.

5. The apparatus defined in claim 4 wherein said means for generating comprises:

means for applying a test sweep signal having monotonically varying frequency of a predetermined amplitude to said transmission line;

detector means responsive to the output signal of said equalizer for comparing the amplitude of said test sweep signal as transmitted by said transmission system to a predetermined reference amplitude level to develop a signal representative of the misalignment of said transmission system for all frequencies in said test sweep signal; and means responsive to the frequency of said test sweep signal for integrating said misalignment signal over each of said plurality of frequency ranges to produce a vector of said integrated misalignment quantities.

6. The apparatus defined in claim 5 wherein said processor means multiplies said vector of integrated misalignment quantities by the inverse of a matrix of said quantities representing the effectiveness of each of said equalizer sections integrated over each of said frequency ranges to produce a vector of said equalizer control quantities.

7. Apparatus for controlling the frequency response levels of the several sections of an adjustable equalizer, said equalizer being responsive to the output signal of transmission line apparatus in a transmission system, comprising:

means for applying a test sweep signal having monotonically varying frequency of a predetermined amplitude to said transmission line:

detector means responsive to the output signal of said equalizer for comparing the amplitude of said test sweep signal as transmitted by said transmission system to a predetermined reference amplitude level to develop an output signal representative of the misalignment of said transmission system for all frequencies in said test sweep signal;

means responsive to the output signal of said detector for integrating said misalignment signal over at least as many frequency ranges in said test sweep signal as there are equalizer sections to be adjusted to produce a plurality of integral misalignment signals; and means for multiplying said plurality of integral misalignment signals by the inverse of a matrix representing the effectiveness of each of said equalizer sections in each of said frequency ranges to produce signals for controlling the frequency response levels of said equalizer sections to reduce said misalignment.

8. Apparatus for controlling the frequency response levels of the several sections of an adjustable equalizer, said equalizer being responsive to the output signal of transmission line apparatus in a transmission system, comprising:

means for applying a test sweep signal having monotonically varying frequency of a predetermined amplitude to said transmission line;

detector means responsive to the output signal of said equalizer for comparing the amplitude of said test sweep signal as transmitted by said transmission system to a predetermined reference amplitude level to develop an output signal representative of the misalignment of said transmission system for all frequencies in said test sweep signal;

means responsive to the output signal of said detector for integrating said misalignment signal over at least as many frequency ranges in said test sweep signal as there are equalizer sections to be adjusted to produce a vector of integral misalignment signal quantities;

means for multiplying said vector of integral misalignment quantities by the inverse of a matrix of quantities representative of the effectiveness of each of said equalizer sections in each of said frequency ranges to produce a vector of signal quantities for controlling the frequency response levels of said equalizer sections to reduce the misalignment of said transmission system; and means for applying said vector of equalizer control quantities to said equalizer.

9. Apparatus for controlling the frequency response levels of the several sections of an adjustable equalizer, said equalizer being responsive to the output signal of transmission line apparatus in a transmission system, each equalizer section being characterized by a normalized frequency response function representative of the effectiveness of the equalizer section at all frequencies in the transmission band of the system, comprising:

means for generating signals representative of the misalignment of said transmission system integrated over each of a plurality of frequency ranges in the transmission band of the system;

means for multiplying said plurality of integral misalignment signals by a matrix derived from the normalized frequency response function of each section of said equalizer integrated over each of said frequency ranges to produce signals for controlling the frequency response levels of said equalizer sections to reduce the misalignment of the transmission system; and means for applying said equalizer control quantities to said equalizer.

10. The apparatus defined in claim 9 wherein said matrix is the inverse of a matrix representing the normalized frequency response functions of each of said equalizer sections integrated over each of said frequency ranges.

11. Apparatus for controlling the frequency response levels of the several sections of an adjustable equalizer, said equalizer being responsive to the output signal of transmission line apparatus in a transmission system, each equalizer section being characterized by a normalized frequency response function representative of the effectiveness of the equalizer section at all frequencies in the transmission band of the system, comprising:

means for generating a vector of signal quantities representative of the misalignment of said transmission system integrated over each of a plurality of frequency ranges in the transmission band of the system;

means for multiplying said vector of integral misalignment signals by a matrix of signal quantities derived from the normalized frequency response function of each section of said equalizer integrated over each of said frequency ranges to produce a vector of signal quantities for controlling the frequency response levels of said equalizer sections to reduce the misalignment of the transmission system; and means for applying said vector of equalizer control quantities to said equalizer.

12. The apparatus defined in claim 11 wherein said matrix is the inverse of an effectiveness matrix of quantities proportional to the normalized frequency response functions of each of said equalizer sections integrated over each of the frequency ranges.

13. The apparatus defined in claim 12 wherein the elements in each column of the effectiveness matrix are the integrated normalized frequency response quantities for one of said equalizer sections.

14. In a transmission system including a transmission line and an adjustable equalizer responsive to the output signal of the transmission line, said equalizer having a plurality of equalizer sections the frequency response levels of which are controlled by a first plurality of signal quantities stored in memories associated with said equalizer, apparatus for generating a second plurality of signal quantities for modifying said first plurality of signal quantities to reduce the misalignment of the transmission system comprising:

means for generating a vector of signal quantities representative of the misalignment of said transmission system integrated over each of a plurality of frequency ranges in the transmission band of the system;

means for multiplying said vector of integrated misalignment quantities by a matrix of signal quantities representative of the effectiveness of each section of said equalizer in each of said frequency ranges to produce said second plurality of signal quantities; and means for applying said second plurality of signal quantities to said equalizer for modification of said first plurality of signal quantities.

15. In a transmission system including a transmission line and an adjustable equalizer responsive to the output signal of the transmission line, said equalizer having a plurality of equalizer sections the frequency response levels of which are controlled by a first plurality of signal quantities stored in memories associated with said equalizer, apparatus for generating a second plurality of signal quantities for modifying said first plurality of signal quantities to reduce the misalignment of the transmission system comprising:

means for generating a vector of signal quantities representative of the misalignment of said transmission system integrated over each of a plurality of frequency ranges in the transmission band of the system;

means for multiplying said vector of integrated misalignment quantities by a matrix of signal quantities representative of the effectiveness of each section of said equalizer in each of said frequency ranges and by a diagonal matrix of gain control quantities to produce said second plurality of signal quantities; and means for applying said second plurality of signal quantities to said equalizer for modification of said first plurality of signal quantities.

16. The method of controlling the frequency response levels of the several sections of an adjustable equalizer, said equalizer being responsive to the output signal of transmission line apparatus in a transmission system, comprising the steps of:

applying a test sweep signal having monotonically varying frequency of a predetermined amplitude to said transmission line;

comparing the amplitude of said test sweep signal as transmitted by said transmission system to a predetermined reference amplitude level to develop a signal representative of the misalignment of said transmission system for all frequencies in said test sweep signal;

integrating said misalignment signal over at least as many frequency ranges in said test sweep signal as there are equalizer sections to be adjusted to produce a plurality of integral misalignment signals; and multiplying said plurality of integral misalignment signals by a matrix indicative of a characterization of the effectiveness of said equalizer sections in each of said frequency ranges to produce signals for controlling the frequency response levels of said equalizer sections to reduce said misalignment.

17. The method of controlling the frequency response levels of the several sections of an adjustable equalizer, said equalizer being responsive to the output signal of transmission line apparatus in a transmission system, comprising the steps of:

applying a test sweep signal having monotonically varying frequency of a predetermined amplitude to said transmission line;

comparing the amplitude of said test sweep signal as transmitted by said transmission system to a predetermined reference amplitude level to develop a signal representative of the misalignment of said transmission system for all frequencies in said test sweep signal;

integrating said misalignment signal over at least as many frequency ranges in said test sweep signal as there are equalizer sections to be adjusted to produce a vector of integral misalignment signal quantities; and multiplying said vector of integral misalignment quantities by the inverse of a matrix of quantities representative of the effectiveness of each of said equalizer sections in each of said frequency ranges to produce a vector of signal quantities for controlling the frequency response levels of said equalizer sections to reduce the misalignment of said transmission system.

* * * * *